(12) United States Patent
Nava et al.

(10) Patent No.: US 9,068,045 B2
(45) Date of Patent: Jun. 30, 2015

(54) CURING OF LIQUID THERMOSETTING RESINS

(71) Applicant: Reichhold, Inc., Research Triangle Park, NC (US)

(72) Inventors: Hildeberto Nava, Cary, NC (US); Anthony Skrobacki, Garner, NC (US)

(73) Assignee: Reichhold, Inc., Research Triangle Park, NC (US)

( * ) Notice: Subject to any disclaimer, the term of this patent is extended or adjusted under 35 U.S.C. 154(b) by 0 days.

(21) Appl. No.: 14/229,517

(22) Filed: Mar. 28, 2014

(65) Prior Publication Data

US 2014/0303315 A1    Oct. 9, 2014

Related U.S. Application Data

(60) Provisional application No. 61/808,686, filed on Apr. 5, 2013.

(51) Int. Cl.
   *C08F 20/10*   (2006.01)
   *C08G 63/91*   (2006.01)

(52) U.S. Cl.
   CPC .................................. *C08G 63/914* (2013.01)

(58) Field of Classification Search
   CPC ..................................................... C08G 63/914
   USPC ......................................... 524/555, 437, 556
   See application file for complete search history.

(56) References Cited

U.S. PATENT DOCUMENTS

| | | | |
|---|---|---|---|
| 3,169,945 A | 2/1965 | Hostettler et al. | |
| 3,338,876 A | 8/1967 | Kanavel et al. | |
| 3,836,600 A | 9/1974 | Brewbaker et al. | |
| 3,883,612 A | 5/1975 | Pratt et al. | |
| 3,929,929 A | 12/1975 | Kuehn | |
| 3,947,422 A | 3/1976 | Tatum et al. | |
| 3,970,505 A | 7/1976 | Hauser et al. | |
| 3,986,922 A | 10/1976 | Parker et al. | |
| 4,012,542 A | 3/1977 | Oswitch et al. | |
| 4,141,883 A | 2/1979 | Soma et al. | |
| 4,182,830 A | 1/1980 | Ford, Jr. | |
| 4,310,708 A | 1/1982 | Strege et al. | |
| 4,324,717 A | 4/1982 | Layer | |
| 4,569,976 A | 2/1986 | Zimmerman et al. | |
| 4,644,039 A | 2/1987 | Boyd et al. | |
| 5,037,944 A * | 8/1991 | Smaardijk et al. ............ 528/229 |
| 5,728,872 A | 3/1998 | Riemenschneider | |
| 6,200,460 B1 | 3/2001 | Sutoris et al. | |
| 7,173,074 B2 | 2/2007 | Mitra et al. | |
| 7,498,367 B2 | 3/2009 | Qian | |
| 8,039,559 B2 | 10/2011 | Jansen et al. | |
| 2002/0007022 A1 * | 1/2002 | Oosedo et al. ................ 525/527 |
| 2008/0319138 A1 | 12/2008 | Kuang | |

FOREIGN PATENT DOCUMENTS

| | | |
|---|---|---|
| JP | 57-179218 S | 11/1982 |
| WO | WO 90/12824 A1 | 11/1990 |
| WO | WO 01/40149 A2 | 6/2001 |
| WO | WO 01/40404 A1 | 6/2001 |
| WO | WO 01/42313 A1 | 6/2001 |
| WO | WO 03/093384 A1 | 11/2003 |
| WO | WO 2005/047379 A1 | 5/2005 |
| WO | WO 2006/128816 A1 | 12/2006 |
| WO | WO 2006/131295 A1 | 12/2006 |
| WO | WO 2008/119783 A1 | 10/2008 |
| WO | WO 2011/083309 A1 | 7/2011 |
| WO | WO 2011/124282 A1 | 10/2011 |
| WO | WO 2011/157673 A1 | 12/2011 |
| WO | WO 2012/126917 A1 | 9/2012 |
| WO | WO 2012/126918 A1 | 9/2012 |
| WO | WO 2012/126919 A1 | 9/2012 |
| WO | WO 2014/032710 A1 | 3/2014 |

OTHER PUBLICATIONS

Notification of Transmittal of the International Search Report and the Written Opinion of the International Searching Authority, or the Declaration corresponding to International Application No. PCT/US2014/032312 mailed Aug. 25, 2014.

* cited by examiner

*Primary Examiner* — Doris Lee
(74) *Attorney, Agent, or Firm* — Myers Bigel Sibley & Sajovec, P.A.

(57) ABSTRACT

The compositions of the present invention for accelerating the curing of thermosetting resins, including a) an organophosphine metal complex, optionally with a transition metal salt essentially free of cobalt; b) a tertiary amine, optionally with a quaternary ammonium or phosphonium salt; and c) a peroxide initiator.

21 Claims, No Drawings

CURING OF LIQUID THERMOSETTING RESINS

RELATED APPLICATION

This application claims priority from U.S. Provisional Application Ser. No. 61/808,686, filed Apr. 5, 2013, the disclosure of which is hereby incorporated by reference herein in its entirety.

FIELD OF THE INVENTION

The present invention relates generally to accelerators for the curing of thermosetting resins in the presence of metal complexes, tertiary amines, quaternary ammonium salts and peroxide initiators.

BACKGROUND OF THE INVENTION

Thermosetting resins used in casting or open and close mold applications are typically cured by a free radical polymerization process. Examples of such thermosetting resin include unsaturated polyester resins, vinyl ester resins and urethane(meth)acrylates. The backbone of these resins either contain ethylenically unsaturated groups such as fumarate or (meth)acrylate and are dissolved in a liquid copolymerisable monomer such as styrene, methyl methacrylate or vinyl toluene. Such resins are liquid under normal conditions but, when treated with a source of free radicals such as an organic peroxide initiator an in the presence of a promoter, will rapidly crosslink to form a hard thermoset crosslinked network. Such a process is used in the production of, for example, castings, coatings, adhesives and fiber reinforced articles.

Commercially available promoter systems for ambient cure thermosetting resins include accelerators or promoters used in conjunction with the initiator and include, for example, salts of metals chosen from among lithium, calcium, copper, vanadium, zirconium, titanium, zinc, iron, sodium, potassium, magnesium, manganese, barium and cobalt, in combination with one or more compounds of alkyl organic acids, halides, nitrates to form a coordination compound. Any skill in the art can choose a metal salt comprising a combination of transition metal salts. This means e.g. one kind of transition metal but different coordination ions or ligands; different transition metal ions and one kind of coordinating ions or ligands; and combinations of these. The accelerator may be added in several different manners. For example, the accelerator may be pre-mixed to form a metal salt complex prior to it being added to the resin composition. Another possibility is to add the individual components of the accelerator composition to the resin and form the metal complex in situ. The most preferred method will depend on the specific curing process being carried out. Examples of the metal salts are described for example in PCT Publication Nos. WO9012824A1 and WO03093384A1, and U.S. Pat. No. 8,039,559 (B2); the disclosures of which are incorporated herein by reference in their entirety.

The choice of the metal ion of metal salts depends upon several parameters, such as activity at ambient temperatures, possible coloring effects, toxicity, stability in the thermoset product, price, and the like. It should be taken into account that the activity of the metal ion also depends upon the kind of coordinating groups. Because of their good performance at ambient temperature, cobalt-containing accelerators are the most widely used copromoters. However, a disadvantage of cobalt is that cobalt carboxylates are suspect to high toxicity (carcinogenicity). Hence, there is an increasing demand in the thermosetting resin industry for promoters that can provide an appropriate curing without compromising performance of the resulting products.

Much attention has recently been given to thermosetting systems that can be cured via free radical polymerization together with a variety of accelerators. More in particular, accelerators that are free of any cobalt salts because cobalt carboxylates are suspect to high toxicity (carcinogenicity). Various patents describe promoter systems that do not include cobalt salts and that are able to cure thermosetting resins. Some of these promoter systems are described for example in U.S. Pat. No. 8,039,559 and PCT Publication Nos. WO2005047379A1 and WO2006131295A1.

WO2011083309A1 and WO2011124282A1 describe the preparation of accelerators based on iron/manganese complexes of tridentate, tetradentate, pentadentate, or hexadentate nitrogen donor ligands. These publications describe metal iron and manganes metal complexes able to cure unsaturated polyesters and vinyl esters and do not include any cobalt salts. The nitrogen ligands are made from structures which present some difficulty on the preparation of their chemical structures. Multiple steps are required in there preparation which make the products more expensive due to their fabrication complexity.

There remains the need to have metal complexes that do not include cobalt to cure thermosetting resin systems via free radical polymerization at room temperature or at moderate temperatures, with excellent processability, without compromising their mechanical properties. In addition, it would be advantageous to have a simple and affordable process that would yield products free of toxic or harmful components in the resulting thermosetting materials.

SUMMARY OF THE INVENTION

In the search to find alternative and/or improved compositions for the curing of thermosetting resins in the presence of metal complexes, it has been found that combinations of transition metal salts and peroxide initiators provide a solution to one or more of said problems. The compositions of the present invention accelerate curing of thermosetting resins and comprise a combination of the following components: a) an organophosphine metal complex, optionally with a transition metal salt essentially free of cobalt; b) a tertiary amine, optionally with a quaternary ammonium or phosphonium salt; and c) a peroxide initiator. The organophosphine metal complex and/or the transition metal salt(s) may include metals such as lithium, calcium, copper, vanadium, zirconium, titanium, zinc, iron, sodium, potassium, magnesium, manganese and barium. The metal salts may be contained as chlorides, bromides, iodites, nitrates, sulfates, phosphates, oxalates, salicylates, acetonates, alkyl organic acids, other carboxylates, naphthenates, and the like. They may be incorporated alone, in pairs or with one, two or a mixture of the above mentioned metals.

Any one skilled in the art can choose a metal salt comprising a combination of transition metal salts. This means e.g. one kind of transition metal but different coordination ions or ligands; different transition metal ions and one kind of coordinating ions or ligands; and combinations of these. The composition may be added in several different manners. For example, the composition may be pre-mixed to form a metal salt complex prior to it being added to the resin composition. Another possibility is to add the individual components of the composition to the resin and form the metal complex in situ. The most preferred method will depend on the specific curing process being carried out.

In some embodiments of the present invention, composite articles may be formed by applying a curable thermosetting composition to a substrate or a reinforcing material, such as by impregnating or coating the substrate or reinforcing material, and curing the curable composition.

Other aspects and advantages will be apparent from the following description and the appended claims.

DETAILED DESCRIPTION OF THE INVENTION

The invention is described more fully hereinafter. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, the term "accelerator" or "promoter" includes any and all combinations may indicate the metal complex, metal salts, amines or quaternary ammonium salts. As used herein, the term "co-accelerator" or "co-promoter" includes any and all combinations and may indicate tertiary amines and/or quaternary ammonium salts.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In accordance with embodiments of the present invention, provided are improved compositions for accelerating the curing of resins, particularly thermosetting resins, in the presence of metal complexes which comprise combinations of transition metal salts and peroxide initiators that have surprisingly been found to provide a solution to one or more of the above problems. The compositions of the present invention for the accelerated curing of thermosetting resins, comprise a combination of the following components: a) an organophosphine metal complex, optionally with a transition metal salt essentially free of cobalt; b) a tertiary amine, optionally with a quaternary ammonium or phosphonium salt; and c) a peroxide initiator. The organophosphine metal complex and/or the transition metal salt(s) may include metals such as lithium, calcium, copper, vanadium, zirconium, titanium, zinc, iron, sodium, potassium, magnesium, manganese and barium. The transition metal salt(s) may be contained as chlorides, bromides, iodides, nitrates, sulfates, phosphates, oxalates, salicylates, acetonates, alkyl organic acids, other carboxylates, naphthenates, and the like. They may be incorporated alone, in pairs or with one, two or a mixture of the above mentioned metals. Exemplary transition metal salts include ferrous chloride and copper bromide.

In an embodiment, the phosphine compound of the organophosphine metal complex containing compound of the invention has a structure of Formula I:

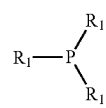

I wherein $R_1$ is, independently in each instance, H, hydroxyl, branched or cyclic aliphatic containing $C_1$ to $C_6$; $C_1$-$C_4$ alkoxy; aryl e.g., $C_6$-$C_{20}$ monocyclic or polycyclic aryl such as phenyl, toluoyl, naphthyl, biphenyl, terphenyl, aryl aromatic containing halogens, amino, silyl; hetheroalkyl e.g., $C_6$-$C_{20}$ monocyclic or polycyclic heteroaryl such as thienyl, furyl, imidazolyl, pyrazolyl, pyridyl, pyrazynyl, pyrimidyl, pyridazinyl, indolyl, quinolyl and isoquinolyl.

In another embodiment, the phosphine compound of the organophosphine metal complex containing compound of the invention has a structure of Formula II:

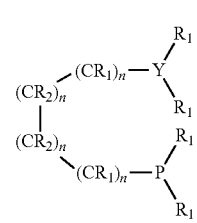

II wherein: $R_1$ is, independently in each instance, H, hydroxyl, branched or cyclic aliphatic containing $C_1$ to $C_6$, $C_1$-$C_4$ alkoxy; aryl e.g., $C_6$-$C_{20}$ monocyclic or polycyclic aryl such as phenyl, toluoyl, naphthyl, biphenyl, terphenyl, aryl aromatic containing halogens, amino, silyl; hetheroalkyl e.g., $C_6$-$C_{20}$ monocyclic or polycyclic heteroaryl such as thienyl, furyl, imidazolyl, pyrazolyl, pyridyl, pyrazynyl, pyrimidyl, pyridazinyl, indolyl, quinolyl and isoquinolyl; $R_2$ is, independently in each instance, H, linear, branched or cyclic aliphatic containing $C_1$ to $C_{14}$, alkyl aromatic, aryl aromatic containing halogens, amino, silyl or alkoxy groups and be interconnected by an aliphatic or an aromatic ring between $R_1$ groups, $R_2$ groups or $R_1$ and $R_2$ groups; n is 0 to 4; and Y is either N or P.

In a further embodiment, the phosphine compound of the organophosphine metal complex containing compound of the invention has a structure of Formula III:

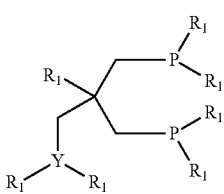

III wherein $R_1$ is, independently in each instance, H, hydroxyl, branched or cyclic aliphatic containing $C_1$ to $C_6$, $C_1$-$C_4$ alkoxy; aryl e.g., $C_6$-$C_{20}$ monocyclic or polycyclic aryl such as phenyl, toluoyl, naphthyl, biphenyl, terphenyl, aryl aromatic containing halogens, amino, silyl; hetheroalkyl e.g., $C_6$-$C_{20}$ monocyclic or polycyclic heteroaryl such as thienyl, furyl, imidazolyl, pyrazolyl, pyridyl, pyrazynyl, pyrimidyl, pyridazinyl, indolyl, quinolyl and isoquinolyl; and Y is N or P.

In still a further embodiment, the phosphine compound of the organophosphine metal complex containing compound of the invention has a structure of Formula IV:

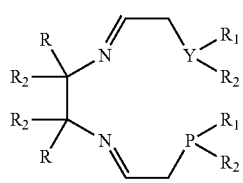

IV wherein: R is, independently in each instance, H, linear, branched or cyclic aliphatic containing $C_1$ to $C_{14}$, alkyl aromatic, aryl aromatic containing halogen, amino or alkoxy groups; $R_1$ is, independently in each instance, H, hydroxyl, branched or cyclic aliphatic containing $C_1$ to $C_6$, $C_1$-$C_4$ alkoxy; aryl e.g., $C_6$-$C_{20}$ monocyclic or polycyclic aryl such as phenyl, toluoyl, naphthyl, biphenyl, terphenyl, aryl aromatic containing halogens, amino, silyl; hetheroalkyl e.g., $C_6$-$C_{20}$ monocyclic or polycyclic heteroaryl such as thienyl, furyl, imidazolyl, pyrazolyl, pyridyl, pyrazynyl, pyrimidyl, pyridazinyl, indolyl, quinolyl and isoquinolyl; $R_2$ is, independently in each instance, H, linear, branched or cyclic aliphatic containing $C_1$ to $C_{14}$, alkyl aromatic, aryl aromatic containing halogen, silyl, amino or alkoxy groups and be interconnected by an aliphatic or an aromatic ring; and Y is either N or P.

In additional embodiments of the invention, the phosphine compounds of the organophosphine metal complex containing compound of the invention are ligands within the complex. These phosphine ligands may be but are not limited to: (2,4)-Bis(di-tert-butylphosphino)pentane, 1,4-Bis(di-tert-butylphosphino)butane, 1,2-Bis(di-tert-butylphosphino)ethane, Bis(di-tert-butylphosphino)methane, Bis(di-tert-butylphosphino)pentane, 1,3-Bis(di-tert-butylphosphino)propane, 1,2-Bis(dicyclohexylphosphino)ethane, 1,3-Bis(dicyclohexylphosphino)propane, 1,4-Bis(dimethylphosphino)butane, 1,2-Bis(dimethylphosphino)ethane, 1,3-Bis(dimethylphosphino)propane, Bis(dimethylamino)methylphosphine, di-tert-butylmethylphosphine, di-tert-butylneopentylphosphine, di-tert-butylphenylphosphine, dicyclohexylnorbornylphosphine, dripropylphosphine, triisopropylphosphine, tri-tert-butylphosphine, triisobutylphosphine, tricyclohexylphosphine, tris(2-furyl)phosphine, tris(3-methoxypropyl)phosphine, tris(1-naphthyl)phosphine, trimethylphosphine, triethylphosphine, diethylphenylphosphine, triphenylphosphine, ortho-phenylene bis(diphenylphosphine), ortho-phenylene bis(dimethylphosphine), ortho-phenylene bis(diethylphosphine), ortho-phenylene bis(ethylphenylphosphine), tris(diphenylphosphinoethyl)phosphine, tris(diethylphosphinoethyl)phosphine, tris(dimethylphosphinoethyl)phosphine, tris(ethylphenylphosphinoethyl)phosphine, (2-methoxyphenyl)methylphenylphosphine, 1-Bromo-2-diphenylphosphinobenzene, dimethyl(phenyl)phosphine, cyclohexyldiphenylphosphine, cicyclohexylphenylphosphine, Bis(3,5-ditrifluoromethylphenyl)phenylphosphine, di-tert-butyl(4-dimethylaminophenyl)phosphine, (4-dimethylaminophenyl)diphenylphosphine, Bis(2-(bis(diethylamido)phosphino)phenyl)ether, Bis(2-diphenylphosphinoethyl)phenylphosphine, 2,6-Bis(diphenylphosphinomethyl)pyridine, 2,6-Bis[bis(3,5-dimethylphenyl)phosphinomethyl]pyridine, 2-(diphenylphosphino)pyridine, Bis(2-diphenylphosphinophenyl)ether, diphenylphosphinostyrene, ethyldiphenylphosphine, methyldiphenylphosphine, 2,2'-Bis(diphenylphosphino)-1,1'-binaphthyl, (2,3)-Bis(diphenylphosphino)butane, (2,5)-Bis(diphenylphosphino)hexane, 1,2-Bis(diphenylphosphino)propane, (1,2)-Bis[(2-methoxyphenyl)phenylphosphino]ethane, 2,2'-Bis[bis(3,5-dimethylphenyl)phosphino]-1,1'-binaphthyl, 1,4-Bis[bis(3,5-dimethylphenyl)phosphino]butane, 1,2-Bis[bis(3,5-dimethylphenyl)phosphino]ethane, Bis[bis(3,5-dimethylphenyl)phosphino]methane, 1,5-Bis[bis(3,5-dimethylphenyl)phosphino]pentane, 1,3-Bis[bis(3,5-dimethylphenyl)phosphino]propane, 2,2'-Bis[bis(3,5-ditrifluoromethylphenyl)phosphino]-1,1'-binaphthyl, 2,2'-Bis(di-p-tolylphosphino)-1,1'-binaphthyl, (1,2)-Bis[(2-methoxyphenyl)phenylphosphino]ethane, 1,3-Bis[bis(o-methoxyphenyl)phosphino]propane, 1,4-Bis[bis(3,5-ditrifluoromethylphenyl)phosphino]butane, 1,2-Bis[bis(3,5-ditrifluoromethylphenyl)phosphino]ethane, Bis[bis(3,5-ditrifluoromethylphenyl)phosphino]methane, 1,3-Bis[bis(3,5-ditrifluoromethylphenyl)phosphino]propane, Bis[bis(3,5-ditrifluoromethylphenyl)phosphino]methane, 1,2-Bis(di-tert-butylphosphino)benzene, 2,2'-Bis(di-tert-butylphosphino)biphenyl, 1,2-Bis(di-tert-butylphosphinomethyl)benzene, 1,3-Bis(di-tert-butylphosphinomethyl)benzene, 1,2-Bis(dicyclohexylphosphino)benzene, 2,2'-Bis(dicyclohexylphosphino)-1,1'-binaphthyl, 2,2'-Bis(dicyclohexylphosphino)biphenyl, 1,2-Bis(diphenylphosphino)benzene, 2,2'-Bis(diphenylphosphino)-1,1'-binaphthyl, 2,2'-Bis(diphenylphosphino)-1,1'-biphenyl, 1,4-Bis(diphenylphosphino)butane, 1,2-Bis(diphenylphosphino)ethane, Bis(2-diphenylphosphino)ethyl ether, Bis(2-diphenylphosphinoethyl)phenylphosphine, 1,6-Bis(diphenylphosphino)hexane, Bis(diphenylphosphino)methane, 1,5-Bis(diphenylphosphino)pentane, Bis(2-diphenylphosphinophenyl)ether, 1,3-Bis(diphenylphosphino)propane, 2,2'-Bis[bis(3,5-dimethylphenyl)phosphino]-1,1'-binaphthyl, 2,2'-Bis[bis(3,5-ditrifluoromethylphenyl)phosphino]-1,1'-binaphthyl, 2,2'-Bis[bis(4-methylphenyl)phosphino]-5,5',6,6',7,7',8,8'-octahydro-1,1'-binaphthyl, (1R,2R)-Bis[(2-methoxyphenyl)phenylphosphino]ethane, 1,1'-Bis[bis(diethylamino)phosphino]ferrocene, 1,1'-Bis(di-tert-butylphosphino)ferrocene, 1,1'-Bis(dicyclohexylphosphino)ferrocene, 2-tert-Butylimino-2-diethylamino-1,3-dimethyl-perhydro-1,3,2-diazaphosphorine, tert-Butylimino-tri(pyrrolidino)phosphorane, Hexaethylphosphorous triamide, Hexaisopropylphosphorus triamide, Tris(4-morpholino)phosphine, and the like and combinations thereof.

Preferably the organophosphine metal complex containing compound added to the resin may be in the range from 0.0001 to about 3.0 percent based on the resin weight. In one embodiment, the amount of organophosphine metal complex containing compound added to the resin may be in the range from 0.001 to about 1.0 weight percent based on the resin weight. In another embodiment, the amount of organophosphine metal complex containing compound added to the resin may be in the range from 0.001 to about 0.5 weight percent by weight based on the resin weight. The level of organophosphine metal complex containing compound added to resin and the optional transition metal salt essentially free of cobalt may depend on the ultimate gel time and curing desired of the thermosetting resin. In another embodiment of the invention, the thermosetting resin may also include a tertiary amine and optionally a quaternary ammonium salt used as co-promoters to cure the resin systems.

In accordance with some embodiments of the present invention, unsaturated polyester resins may be prepared by the condensation of polycarboxylic acid or anhydrides with polyhydric alcohols under a nitrogen atmosphere. Anhydrides that can be employed in the making of resins or thermosetting resins of the present invention are preferably cyclic or acyclic, saturated or unsaturated. In a "cyclic" anhydride, the anhydride functionality is contained within a ring, such as in phthalic anhydride and maleic anhydride. "Saturated" anhydrides contain no ethylenic unsaturation, although they may contain aromatic rings. Phthalic anhydride and succinic anhydride are examples of saturated anhydrides. "Unsaturated" anhydrides contain ethylenic unsaturation. This unsaturation typically becomes incorporated into the hydroxyl containing intermediates, and form part of the crosslinking of the thermosetting resin. Examples include maleic anhydride, itaconic anhydride, and the like.

Specific examples of suitable anhydrides include, but are not limited to, propionic anhydride, maleic anhydride, phthalic anhydride, tetrabromophthalic anhydride, succinic anhydride, tetrahydrophthalic anhydride, citraconic anhydride, itaconic anhydride, and aryl-, alkyl-, and halogen-substituted derivatives of the above. Mixtures of these anhydrides may be used. The selection of the amounts of polyether and anhydride that may be used can be determined by the end user, and may depend, for example, upon the types of physical properties or degree of crosslinking that is desired.

Specific examples of dicarboxylic acids that may be used in the preparation of resins or thermosetting resins of the invention include but are not limited to, fumaric acid, isphthalic acid, terephthalic acid, adipic acid, cyclohexane dicarboxylic acid, succinic anhydride, adipic acid, sebacic acid, azealic acid, malonic acid, alkenyl succinic acids such as n-dodecenylsuccinic acid, docecylsuccinic acid, octadecenylsuccinic acid, and anhydrides thereof. Lower alkyl esters of any of the above may also be employed. Mixtures of any of the above are suitable.

Additionally, polybasic acids or anhydrides thereof, having not less than three carboxylic acid groups may be employed. Such compounds include 1,2,4-benzenetricarboxylic acid, 1,3,5-benzene tricarboxylic acid, 1,2,4-cyclohexane tricarboxylic acid, 2,5,7-naphthalene tricarboxylic acid, 1,2,4-naphthalene tricarboxylic acid, 1,3,4-butane tricarboxylic acid, 1,2,5-hexane tricarboxylic acid, 1,3-dicarboxyl-2-methyl-2-carboxymethylpropane, tetra(carboxymethyl)methane, 1,2,7,8-octane tetracarboxylic acid, and mixtures thereof.

In accordance with embodiments of the present invention, a wide range of polyhydric alcohols may be used in the method of preparing resins or thermosetting resins of the invention, the selection of which can be determined by one skilled in the art. It is preferred that these alcohols have sufficiently high boiling points such that themselves and their corresponding esters formed therefrom are not volatilized and lost under the reaction condition. The alcohols may include, but are not limited to, ethylene glycol, diethylene glycol, neopentyl glycol, dibromoneopentyldiol, 2-methyl-1, 3-propanediol, 2,2,4-trimethyl-1,3-pentadiol, 2-butyl-2-ethyl-1,3-propanediol, polyethoxylated bisphenol "A", polypropoxylated Bisphenol "A", 1,4-cyclohexane dimethanol, trimethylol propane diallylether, propylene glycol, dipropylene glycol, 1,3-butanediol, 1,4-butanediol, 1,3 hexanediol, 1,3-butylene glycol, 1,6-hexanediol, hydrogeneated bisphenol "A", 1,4-cyclohexanol, ethylene oxide adducts of bisphenols, propylene oxide adducts of bisphenols, sorbitol, 1,2,3,6-hexatetrol, 1,4-sorbitan, pentaerythritol, dipentaerythritol, tripentaerythritol, sucrose, 1,2,4-butanetriol, 1,2,5-pentanetriol, glycerol, 2-methyl-propanetriol, 2-methyl-1, 2,4-butanetriol, trimethylol ethane, trimethylol propane, and 1,3,5-trihydroxyethyl benzene. Halogen or phosphorus containing intermediates of the above may also be employed. Mixtures of the above alcohols may be used.

Optionally, monofunctional alcohols may be included as an option to modify the crosslinking density on the resin or thermosetting resin. The monoalcohols include but are not limited to, n-butanol, n-hexanol, octanol, undecanol, dodecanol, cyclohexylmethanol, benzyl alcohol, phenoxy ethanol, alky and aryl monoalcohols and the like.

In accordance with embodiments of the present invention, DCPD resins used in this invention are known to those skilled in the art. These resins or thermosetting resins are typically DCPD polyester resins and derivatives which may be made according to various accepted procedures. As an example, these resins may be made by reacting DCPD, ethylenically unsaturated dicarboxylic acids, and compounds having two groups wherein each contains a reactive hydrogen atom that is reactive with carboxylic acid groups. DCPD resins made from DCPD, maleic anhydride phthalic anhydride, isophthalic acid, terephthalic acid, adipic acid, water, and a glycol such as, but not limited to, ethylene glycol, propylene glycol, diethylene glycol, neopentyl glycol, dipropylene glycol, and poly-tetramethylene glycol, are particularly preferred for the purposes of the invention. The DCPD resin may also include nadic acid ester segments that may be prepared in-situ from the reaction of pentadiene and maleic anhydride or added in its anhydride form during the preparation of the polyester. Examples on the preparation of DCPD unsaturated polyester resins can be found in U.S. Pat. Nos. 3,883,612 and 3,986,922.

According to some embodiments of the present invention, various amounts of the weight equivalent ratio of polycarboxylic acid or anhydride to polyhydric alcohols may be employed in preparing the resins or thermosetting resins of the invention. Preferably, the weight equivalent ratio of polycarboxylic acid or anhydride to polyhydric alcohols ranges from about 1:1 to about 1:10, and more preferably from about 1:1.5 to about 1:2.5.

Polymerization inhibitors may also be included in the polymerization mixture such as phenothiazine, phenol, 2,6-di-tert-butyl-4-methyl phenol, hydroquinone (HQ), tolu-hydroquinone (THQ), bisphenol "A" (BPA), triphenyl antimony, naphthoquinone (NQ), p-benzoquinone (p-BQ), butylated hydroxy toluene (BHT), hydroquinone monomethyl ether (HQMME), 4-ethoxyphenol, 4-propoxyphenol, and propyl isomers thereof, monotertiary butyl hydroquinone (MTBHQ), ditertiary Butyl hydroquinone (DTBHQ), tertiary butyl catechol (TBC), 1,2-dihydroxybenzene, 2,5-dichlorohydroquinone, 2-acetylhydroquinone, 1,4-dimercaptobenzene, 2,3,5-trimethylhydroquinone, 2-aminophenol, 2-N,N,-dimethylaminophenol, catechol, 2,3-dihydroxyacetrophenone, pyrogallol, 2-methylthiophenol or other substituted and unsubstituted phenols, and mixtures of the above.

Other polymerization inhibitors may include stable hindered nitroxyl compounds such as N,N-di-tert-butylnitroxide; N,N-di-tert-amylnitroxide; N-tert-butyl-2-methyl-1-phenyl-propylnitroxide; N-tert-butyl-1-diethyl phosphono-2, 2-dimethyl propyl nitroxide; 2,2,6,6-tetramethyl-piperidinyloxy; 4-amino-2,2,6,6-tetramethyl-piperidinyloxy; 4-hydroxy-2,2,6,6-tetramethyl-piperidinyloxy; 4-oxo-2,2,6,6-tetramethyl-piperidinyloxy;

4-dimethylamino-2,2,6,6-tetramethyl-piperidinyloxy; 4-ethanoyloxy-2,2,6,6-tetramethyl-piperidinyloxy; 2,2,5,5-tetramethylpyrrolidinyloxy; 3-amino-2,2,5,5-tetramethylpyrrolidinyloxy; 2,2,4,4-tetramethyl-1-oxa-3-azacyclopentyl-3-oxy; 2,2,4,4-tetramethyl-1-oxa-3-pyrrolinyl-1-oxy-3-carboxylic acid; 2,2,3,3,5,5,6,6-octamethyl-1,4-diazacyclohexyl-1,4-dioxy; 4-bromo-2,2,6,6-tetramethyl-piperidinyloxy; 4-chloro-2,2,6,6-tetramethyl-piperidinyloxy; 4-iodo-2,2,6,6-tetramethyl-piperidinyloxy; 4-fluoro-2,2,6,6-tetramethyl-piperidinyloxy; 4-cyano-2,2,6,6-tetramethyl-piperidinyloxy; 4-carboxy-2,2,6,6-tetramethyl-piperidinyloxy; 4-carbomethoxy-2,2,6,6-tetramethyl-1-piperidinyloxy; 4-carbethoxy-2,2,6,6-tetramethyl-piperidinyloxy; 4-cyano-4-hydroxy-2,2,6,6-tetramethyl-piperidinyloxy; 4-methyl-2,2,6,6-tetramethyl-1-piperidinyloxy; 4-carbethoxy-4-hydroxy-2,2,6,6-tetramethyl-piperidinyloxy; 4-hydroxy-4-(1-hydroxypropyl)-2,2,6,6-tetramethy 1-piperidinyloxy; 4-methyl-2,2,6,6-tetranlcthyl-1,2,5,6-tetrahydropyridinyloxyl, and the like. Additional useful stable hindered nitroxyl inhibitors are described on PCT Publication Nos. WO0140404A1, WO0140149A2, WO0142313A1, and U.S. Pat. Nos. 4,141,883, 6,200,460B1, and 5,728,872, incorporated here in their entirety.

According to some embodiments of the present invention, various amounts of inhibitors may be employed. Preferably, the inhibitors ranges from about 0.001 to about 0.5 percent based on the weight of the reactants, and often from about 0.04 to about 0.1 percent by weight.

According to some embodiments, vinyl ester resins or thermosetting resins of the present invention are prepared by the reaction between the vinyl containing organic acid such as methacrylic acid and an epoxide containing intermediate in the presence of a catalyst. Any number of epoxide(s) can be used for the purpose of the invention. Preferably the polyepoxide(s) include but are not limited to glycidyl methacrylate, glycidyl polyethers of both polyhydric alcohols and polyhydric phenols, bisphenol A epoxy, bisphenol F epoxy, glycidyl ester of neodecanoic acid, flame retardant epoxy resins based on tetrabromo bisphenol A, epoxy novolacs, epoxidized fatty acids or drying oil acids, epoxidized diolefins, epoxidized unsaturated acid esters as well as epoxidized unsaturated polyesters. Mixtures of the above may be employed. The polyepoxides may be monomeric or polymeric. Particularly preferred polyepoxides are glycidyl ethers of polyhydric alcohols or polyhydric phenols having equivalent weights per epoxide groups ranging from about 150 to about 1500, more preferably from about 150 to about 1000.

The epoxy component can be used in varying amounts according to some embodiments of preparing resins or thermosetting resins of the present invention. As an example, an epoxide may be reacted with an acid in a proportion of about 1 equivalent of epoxide per each equivalent of acid. The epoxy may be used ranging from about 1 to about 15 percent based on the weight of the reactants. Preferably, the epoxy intermediate is used in an amount ranging from about 3 to about 6 percent by weight.

In the reaction of the epoxy and the vinyl unsaturated acid, a catalyst is used to catalyze the reaction. A number of catalysts may be employed for this purpose. Exemplary catalysts include, but are not limited to, organophosphonium salts, and tertiary amines such as 2,4,6-tri(dimethylaminomethyl)phenol [DMP-30] and the like. Other tertiary amines and quaternary ammonium salts may be used. Examples include, but are not limited to, tetramethylammonium chloride, tetramethylammonium hydroxide, tetramethylammonium bromide, tetramethylammonium hydrogensulfate, benzyltrimethylammonium chloride, benzyltrimethylammonium bromide, benzyltrimethylammonium hydrogen sulfate, benzyltributylammonium chloride, benzyltributylammonium bromide, benzyltributylammonium hydrogen sulfate, 1,4-diazabicyclo [2.2.2]octane, diazabicyclo[4.3.0]-nonene-(5), 2-methyl imidazol, piperidine, morpholine, triethyl amine, tributyl amine, and the like. Mixtures of the above may also be employed.

Phosphorous containing compounds may also be used as a catalyst involving the epoxide. Examples include, but are not limited to, triphenyl phosphine, tributyl phosphine, tri(o-tolyl)phosphine, tris(4-methoxyphenyl)phosphine, tetrabutylphosphonium acetate, tetrabutylphosphonium bromide, tetrabutylphosphonium chloride, tetrabutylphosphonium fluoride, tetrabutylphosphonium iodide, tetraphenylphosphonium chloride, tetraphenylphosphonium bromide, tetraphenylphosphonium acetate and the like, and phosphine salts as those described in U.S. Pat. No. 4,310,708, the disclosure of which is incorporated herein by reference in its entirety.

The reaction involving the epoxide is preferably carried out at a temperature ranging from about 50° C. to about 120° C., and more preferably from about 80° C. to about 110° C.

Urethane(meth)acrylates are also useful in the present invention for the preparation of cured thermosetting products. The compounds are typically the reaction products of polyols in which the hydroxyl groups are first reacted with a diisocyanate using one equivalent of diisocyanate per hydroxyl group, and the free isocyanate groups are the reacted with a hydroxyalkyl ester of acrylic or methacrylic acid. The polyhydric alcohol suitable for preparing the urethane poly(acrylate) typically contains at least two carbon atoms and may contain from 2 to 4, inclusive, hydroxyl groups. Polyols based on the polycaprolactone ester of a polyhydric alcohol such as described in, for example U.S. Pat. No. 3,169,945 are included. Unsaturated polyols may also be used such as those described in U.S. Pat. Nos. 3,929,929 and 4,182,830.

Diisocyanates suitable for preparing the urethane poly (acrylate) are well known in the art and include aromatic, aliphatic, and cycloaliphatic diisocyanates. Such isocyanates may be extended with small amounts of glycols to lower their melting point and provide a liquid isocyanate. The hydroxyalkyl esters suitable for final reaction with the polyisocyanate formed from the polyol and diisocyanate are exemplified by hydroxylacrylate, hydroxypropyl acrylate, hydroxyethyl methacrylate, and hydroxypropyl methacrylate.

Other components may be employed in accordance with the present invention. Examples of components include, but are not limited to, polymerization inhibitors, free radical scavengers, and antioxidants. The thermosetting resins of the invention may be used in combination with other thermosetting resins such as polyesters, vinyl esters, polyurethane (meth)acrylates and suitable monomeric components to form a liquid resin. The liquid resin may be employed, for example, as a laminating resin, molding resin, or a gel coat resin as a coating on a suitable substrate. A number of substrates may be employed such as, for example, a marine vessel, a vehicle, or an aircraft.

A vinyl monomer may also be included as a diluent with the unsaturated polyester, vinyl ester and polyurethane(meth) acrylate. Suitable monomers may include those such as, for example, styrene and styrene derivatives such as alpha-methyl styrene, p-methyl styrene, divinyl benzene, divinyl toluene, ethyl styrene, vinyl toluene, tert-butyl styrene, monochloro styrene, dichlorostyrene, trichlorostyrene, bromostyrene, dibromostyrene, tribromostyrene, fluorostyrene, difluorostyrene, trifluorostyrene, tetrafluorostyrene and pentafluorostyrene, halogenated alkylstyrenes such as chloromethylstyrene, alkoxystyrenes such as paramethoxy styrene. Monounsaturated compounds maybe used alone or in combination.

Other monomers which may be used include allylic compounds containing more than one allyl group per molecule. For example, diallyl phthalate, diallyl itaconate, diallyl maleate, triallylmellitate, triallylmesate, triallylisocyanurate, triallycyanurate, and partial polymerization products prepared therefrom.

Other unsaturated compounds also include (meth)acrylates and acrylamides. For example, methyl (meth)acrylate, ethyl (meth)acrylate, propyl (meth)acrylate, hexyl(meth)acrylate, octyl (meth)acrylate, cyclohexananol(meth)acrylate, phenoxyethyl(meth)acrylate, hydroxyethyl (meth)acrylate, hydroxypropyl (meth)acrylate, and mixtures thereof.

Any suitable polyfunctional acrylate may be used in the resin composition. Such compounds include ethylene glycol di(meth)acrylate, butanediol di(meth)acrylate, hexanediol di(meth)acrylate, ethoxylated trimethylolpropane tri(meth)acrylate, trimethylolmethane tetra(meth)acrylate, pentaerythritol tetra(meth)acrylate, dipentaerythritol tetra(meth)acrylate, dipentaerythritol penta(meth)acrylate, dipentaerythritol hexa(meth)acrylate, ethoxylated polyhydric phenol di(meth)acrylates containing from 1 to 30 ethylene oxide units per OH group in the phenol, propoxylated polyhyric phenol dia(meth)crylates and di(meth)acrylates containing from 1 to 30 propylene oxide groups per OH groups in the phenol. Examples of some useful di- and polyhydric phenols include catechol; resorcinol; hydroquinone; 4,4'-biphenol; 4,4'-ispropylidenebis(o-cresol); 4,4'-isopropylidenebis(2-phenyl phenol); alkylidenediphenols such as bisphenol "A"; pyrogallol; phloroglucinol; naphthalene diols; phenol; formaldehyde resins; resorcinol/formaldehyde resins; and phenol/resorcinol/formaldehyde resins. Halogen or phosphorus containing intermediates of the above may also be employed. Mixtures of the above mono-, di- and poly(meth)acrylates may also be employed.

The liquid thermosetting resin systems and/or their mixtures may include an initiator to aid in the curing (crosslinking) of the resin. A number of initiators may be employed, such as, for example, an organic peroxide. Exemplary organic peroxides that may be used include, for example, cumene hydroperoxide; methyl ethyl ketone peroxide; benzoyl peroxide; 2,4-pentanedione peroxide; 2,5-dimethylhexane-2,5-dihydroperoxide; tert-butyl peroxybenzoate; di-tert-butyl perphthalate; dicumyl peroxide; 2,5-dimethyl-2,5-bix(tert-butylperoxide)hexane; 2,5-dimethyl-2,5-bis(tert-butylperoxy)hexyne; bis(tert-butylperoxyisopropyl)benzene; ditert-butyl peroxide; 1,1-di(tert-amylperoxy)-cyclohexane; 1,1-di-(tert-butylperoxy)-3,3,5-trimethylcyclohexane; 1,1-di-(tert-butylperoxy)-cyclohexane; 2,2-di-(tert-butylperoxy)butane; n-butyl-4,4-di(tert-butylperoxy)valerate; ethyl-3,3-di-(tert-amylperoxy)butyrate; ethyl-3,3-di(tert-butylperoxy)-butyrate; t-butyl peroxy-neodecanoate; di-(4-5-butyl-cyclohexyl)-peroxydicarbonate; lauryl peroxide; 2,5-dimethyl-2,5-bis(2-ethyl-hexanoyl peroxy)hexane; t-amyl peroxy-2-ethylhexanoate; 2,2'-azobis(2-methylpropionitrile); 2,2'-azobis(2,4-methylbutanenitrile); and the like. Mixtures of any of the above may be used. The agent is preferably employed in an amount from about 0.2 to 3.0 percent based on the weight of the thickened resin, more preferably from about 1 to 1.5 percent by weight, and most preferably from about 0.5 to 1.25 percent by weight.

The accelerators of the present invention for the curing of thermosetting resins, comprise a combination of the following components: a) an organophosphine metal complex, optionally with a transition metal salt essentially free of cobalt; b) a tertiary amine, optionally with a quaternary ammonium or phosphonium salt; and c) a peroxide initiator. The organophosphine metal complex and the transition metal salt(s) may include metals such as lithium, calcium, copper, vanadium, zirconium, titanium, zinc, iron, sodium, potassium, magnesium, manganese and barium. The metal salts may be contained as chlorides, bromides, iodides, nitrates, sulfates, phosphates, oxalates, salicylates, alkyl organic acids, other carboxylates, naphthenates, and the like. They may be incorporated alone, in pairs or with one, two or a mixture of the above mentioned metals. This means e.g. one kind of transition metal but different coordination ions or ligands; different transition metal ions and one kind of coordinating ions or ligands; and combinations of these. The accelerator may be added in several different manners. For example, the accelerator may be pre-mixed to form a metal salt complex prior to it being added to the resin composition. Another possibility is to add the individual components of the accelerator composition to the resin and form the metal complex in situ. The most preferred method will depend on the specific curing process being carried out. Examples of the metal salts are described for example in PCT Publication Nos. WO9012824A1 and WO03093384A1, and U.S. Pat. No. 8,039,559 (B2); the disclosures of which are incorporated herein by reference in their entirety.

Several tertiary amines may be used in combination with the metal salts such as N,N-dimethyl aniline, N,N-diethyl aniline, N,N-dimethyl acetoacetamide, N,N-dimethyl p-toluidine, trithylamine, triethanolamine, and tertiary aromatic amines. Examples of suitable quaternary ammonium salts include but are not limited to stearyldimethylethylammonium ethylsulfate, stearamidopropyldimethyl-β-hydroxyethyl ammoniumnitrate, N,N,-bis(2-hydroxyethyl)-N-(3'-dodecyloxy-2'-hydroxypropyl) methylammonium methylsulfate, tricaprylmethyl ammonium chloride, ditallow dimethyl ammonium salt, tributyl ammonium methyl sulfate, trihexyltetradecylphosphonium bis(2,4,4-trimethylpentyl) phosphonate, trihexyltetradecylphosphonium bromide, trihexyltetradecylphosphonium chloride, trihexyltetradecylphosphonium decanoate, trihexyltetradecylphosphonium hexafluorophosphate, 3-(triphenylphosphonio)propane-1-sulfonate, 1-butylpyridinium bromide, 1-butylpyridinium chloride. Other tertiary fatty amines may also be incorporated such as ethoxylated amines derived from coco, soya, tallow or stearyl amines. Other accelerators that can also be added include but are not limited to 1,3-doketones such as acetylacetone, benzoylacetone, and the like. Mixtures of the above may be used. Thioureas such as 1,3-Di-o-tolyl-2-thiourea, 1,3-Di-p-tolyl-2-thiourea, 1,3-Di-tert-butyl-2-thiourea, 1,3-Diallyl-2-thiourea, 1,3-Dibenzyl-2-thiourea, 1-(3-Pyridyl)-2-thiourea, 1-butyl-2-thiourea, 1-butyl-3-phenyl-2-thiourea, acetylthiourea, tetramethylthiourea, thiourea, N-ethylthiourea, N,N'-dibutylthiourea, N,N'-diethylthiourea, N,N'-dimethylthiourea, N,N'-diphenylthiourea, N,N'-diphenylthiourea, N-phenylthiourea and mixtures thereof may be used. Examples of thioureas are described for example in U.S. Pat. Nos. 3,338,876; 3,970,505; 4,569,976; 7,173,074; and 7,498,367; the disclosures of which are incorporated herein by reference in their entirety. Mixtures of the above may be used.

The curing accelerators or promoters are preferably employed in amounts from about 0.0001 to about 3.0 percent by weight, often from about 0.001 to 1.0 percent by weight, and sometimes from about 0.01 to 0.5 percent based on the resin weight of the vinyl containing intermediate or their mixtures thereof.

Flame retardant compounds may also be included in the present invention such as those described in numerous publications and patents known to those skilled in the art. Useful in formulating flame retardant compositions are, for example, brominated flame retardants compounds. Preferred brominated flame retardant compounds include, for example, 1,3,5-tris(2,4,6-tribromophenoxy)triazine, brominated polystyrene, brominated cyclodecane, brominated Bisphenol-A diglycidyl ether, alkyl or aryl or mixed aromatic-aliphatic phosphate esters such as Triphenyl, tricresyl phosphate, diphenyl-(2-ethyl hexyl)phosphate, tris(2-chlorosiopropyl) phosphate, trithylphosphate, tri-n-butyl phosphate, tri-isobutyl phosphate, di-n-butyl phosphate, tris(allyphenylphosphate), tris(2-methoxy-4-allylphosphate), tris(2-propylphenyl)phosphate, tri(4-vinylphenyl)phosphate, bis (diphenylphosphate ester)s of bisphenols such as Bisphenol-A, resorcinol or hydroquinone, resorcinol bis(2,6-dixylenyl phosphate), bis(diphenylphosphoramide)s, phosphonates such as dimethymethyl phosphonate, dimethylpropyl phosphonate, phosphites such as dimethyl phosphite, diethyl phosphite, trimethyl phosphite, triethyl phosphite, melamine polyphosphate, melamine cyanurate, metal phosphites, inorganic metal phosphites, red phosphorus, ammonium polyphosphate, and the like and mixtures thereof.

Addition of fiber(s) provides a means for strengthening or stiffening the polymerized cured composition forming the substrate. The types often used are: Inorganic crystals or polymers, e.g., glass fiber, quartz fibers, silica fibers, fibrous ceramics, e.g., alumina-silica (refractory ceramic fibers); boron fibers, silicon carbide, silicon carbide whiskers or monofilament, metal oxide fibers, including alumina-boric-silica, alumina-chromia-silica, zirconia-silica, and others.

Organic polymer fibers, e.g., fibrous carbon, fibrous graphite, acetates, acrylics (including acrylonitrile), aliphatic polyamides (e.g. nylon), aromatic polyamides, olefins (e.g., polypropylenes, polyesters, ultrahigh molecular weight polyethylenes), polyurethanes (e.g., Spandex), alpha-cellulose, cellulose, regenerated cellulose (e.g., rayon), jutes, sisal, vinyl chlorides, vinylidenes, flax, and thermoplastic fibers; metal fibers, e.g., aluminum, boron, bronze, chromium, zinc, nickel, stainless steel, titanium or their alloys; and "whiskers", single, inorganic crystals.

Suitable filler(s) non-fibrous are inert, particulate additives being essentially a means of reducing the cost of the final product while often enhancing some of the desired physical properties of the polymerized cured compound. Fillers used in the invention include calcium carbonate of various form and origins, silica of various forms and origins, silicates, silicon dioxides of various forms and origins, clays of various forms and origins, feldspar, kaolin, flax, zirconia, calcium sulfates, micas, talcs, wood in various forms, glass (milled, platelets, spheres, micro-balloons), plastics (milled, platelets, spheres, micro-balloons), recycled polymer composite particles, metals in various forms, metallic oxides or hydroxides (except those that alter shelf life or viscosity), metal hydrides or metal hydrates, carbon particles or granules, alumina, alumina powder, aramid, bronze, carbon black, carbon fiber, cellulose, alpha cellulose, coal (powder), cotton, fibrous glass, graphite, jute, molybdenum, nylon, orlon, rayon, silica amorphous, sisal fibers, fluorocarbons and wood flour.

Additional additives known by the skilled artisan may be employed in the laminating resin composition of the present invention including, for example, thixotropic agents, paraffin waxes, fatty acids, fatty acid derivatives, lubricants, and shrink-reducing additives. Various percentages of these additives can be used in the laminating resin composition.

Thermoplastic polymeric materials which reduce shrinkage during molding can also be included in the composition of the invention. These thermoplastic materials can be used to produce molded articles having surfaces of improve smoothness. The thermoplastic resin is added into the unsaturated polyester composition according to the invention in order to suppress shrinkage at the time of curing. The thermoplastic resin is provided in a liquid form and is prepared in such a manner that 30 to 45% by weight of the thermoplastic resin is dissolved in 55 to 70% by weight of polymerizable monomer having some polymerizable double bond in one molecule. Examples of the thermoplastic resin may include styrene-base polymers, polyethylene, polyvinyl acetate base polymer, polyvinyl chloride polymers, polyethyl methacrylate, polymethyl methacrylate or copolymers, ABS copolymers, Hydrogenated ABS, polycaprolactone, polyurethanes, butadiene styrene copolymer, and saturated polyester resins. Additional examples of thermoplastics are copolymers of: vinyl chloride and vinyl acetate; vinyl acetate and acrylic acid or methacrylic acid; styrene and acrylonitrile; styrene acrylic acid and allyl acrylates or methacylates; methyl methacrylate and alkyl ester of acrylic acid; methyl methacrylate and styrene; methyl methacrylate and acrylamide. In the resin composition according to the invention, 5 to 50% by weight of the liquid thermoplastic resin is mixed; preferably 10 to 30% by weight of the liquid thermoplastic resin is mixed.

Low profile agents (LPA) are composed primarily of thermoplastic polymeric materials. These thermoplastic intermediates present some problems remaining compatible with almost all types of thermosetting resin systems. The incompatibility between the polymeric materials introduces processing difficulties due to the poor homogeneity between the resins. Problems encountered due to phase separation in the resin mixture include, scumming, poor color uniformity, low surface smoothness and low gloss. It is therefore important to incorporate components that will help in stabilizing the resin mixture to obtain homogeneous systems that will not separate after their preparation. For this purpose, a variety of stabilizers can be used in the present invention which includes block copolymers from polystyrene-polyethylene oxide as those described in U.S. Pat. Nos. 3,836,600 and 3,947,422. Block copolymer stabilizers made from styrene and a half ester of maleic anhydride containing polyethylene oxide as described in U.S. Pat. No. 3,947,422. Also useful stabilizers are saturated polyesters prepared from hexanediol, adipic acid and polyethylene oxide available from BYK Chemie under code number W-972.

Additional additives include phenolic type antioxidants as those described in pages 1 to 104 in "Plastic additives", by R. Gächter and Müller, Hanser Publishers, 1990. Include also are Mannich type antioxidants, specially phenols and naphthols, suitable for the purpose herein include hindered aromatic alcohols, such as hindered phenols and naphthols, for example, those described in U.S. Pat. No. 4,324,717, the disclosure of which is incorporated herein by reference in its entirety.

Additional additives known by the skilled artisan may be employed in the resin composition of the present invention including, for example, pigments, dyes, paraffins, lubricants, flow agents, air release agents, flow agents, wetting agents, UV stabilizers, and shrink-reducing additives. Various percentages of these additives can be used in the resin compositions.

Internal release agents are preferably added to the molding composition according to the invention. Aliphatic metal salts such as zinc stearate, magnesium stearate, calcium stearate or aluminum stearate can be used as the internal release agent. The amount of internal release agent added is in the range of 0.5 to 5.0% by weight, more preferably in the range of from 0.4% to 4.0% by weight. Hence, stable release can be made at the time of demolding without occurrence of any crack on the molded product.

In some embodiments of the present invention, composite articles may be formed by applying a curable thermosetting composition to a substrate or a reinforcing material, such as by impregnating or coating the substrate or reinforcing material, and curing the curable composition. The properties accomplished from these materials can provide composite systems that can be used in various applications which can include molding, lamination, infusion, pultrusion, encapsulation, coatings, adhesives, prepregs, electrical and electronic components.

The following examples are provided to illustrate the present invention, and should not be construed as limiting thereof.

EXAMPLES

To a 100 grams of liquid thermosetting resin was added a predetermined amount of the organophosphine metal complex, optionally a metal salt copromoter, and a tertiary amine and optionally a quaternary ammonium salt. All components were mixed and a free radical peroxide initiator was added followed by mixing to start the crosslinking (curing). A tongue depressor was used to periodically check for gelation of the resin. Once the resin gelled, the time was registered and a thermocouple was inserted into the resin to measure the exotherm generated from the curing reaction. The exotherm was recorded together with the time at the maximum temperature observed. Examples are presented in Tables 1 to 5.

Resins Used in the Present Invention:

Described below are the resins used together with the accelerator compositions of the present invention. All resins are available from Reichhold, Inc., Durham, N.C.

The resins are as follows: DION® 495-00 is a terephthalic, propylene glycol fumarate, DION® 6694-00 is a modified bisphenol fumarate, POLYLITE® 31022-00 is an isophthalic, propylene glycol fumarate, POLYLITE® 31220-00 is an isophthalic, neopentyl glycol fumarate, POLYLITE® 31051-00 is a DCPD diethylene glycol fumarate, DION® 9102-70 is a bisphenol "A" epoxy vinyl ester, ADVALITE® 35065-00 is a styrene free vinyl hybrid.

Abbreviations Used in the Tables Below:
$FeCl_2bis(dppbz)$—1,2-Phenylenebis[diphenyl]phosphine iron complex
BrTTPPCu—Bromotris(triphenylphosphine)copper(I).
8% Copper NAP-ALL—Copper Naphthenate. Available from OMG.
DMPT—Dimethyl para-toluidine.
DMAA—N,N-Dimethyl acetoacetamide.
QUAT—Alkyl dimethyl benzyl ammonium chloride.
ATUR—N-Allylthiourea.
CHP—Cumene hydroperoxide—Noros CHP. Available from Syrgis.
MEKPO—Methyl ethyl ketone peroxide—Norox MEKP-925. Available from Syrgis.
TTP—Total Time to Peak.

TABLE 1

Room Temperature Gel Times For Phosphine Iron Complex, Amine Promoters & Unsaturated Polyesters.

|  | DION® 495-00 | DION® 6694-00 |
|---|---|---|
| $FeCl_2bis(dppbz)$, ppm | 410 | 440 |
| DMPT, % | 0.30 | 0.30 |
| CHP, % | 1.25 | 1.25 |
| GEL TIME, min. | 9.00 | 14.50 |
| TTP, min. | 20.50 | 27.00 |
| EXOTHERM, C. | 216.00 | 206.00 |

TABLE 2

Room Temperature Gel Times For Phosphine Iron Complex, Amine Promoters, Unsaturated Polyester & Vinyl Hybrid.

|  | DION ® 495-00 | | | | ADVALITE ® 35065-00 | | | |
|---|---|---|---|---|---|---|---|---|
|  | 1 | 2 | 3 | 4 | 1 | 2 | 3* | 4* |
| $FeCl_2bis(dppbz)$, ppm | 100 | 100 | 50 | 50 | 50 | 50 | 50 | 50 |
| DMPT, % | 0.2 | 0.2 | 0.2 | 0.2 | 0.2 | 0.2 | 0.2 | 0.2 |
| QUAT, % | 0.2 | 0.2 | 0.2 | 0.2 | 0.2 | 0.2 | 0.2 | 0.2 |
| CHP, % | 1.25 | — | 1.25 | — | 1.25 | — | 1.25 | — |
| MEKP, % | — | 1.25 | — | 1.25 | — | 1.25 | — | 1.25 |
| GEL TIME, min. | 6.0 | 6.9 | 9.8 | 7.8 | 32.0 | >45 | 20.0 | 21.9 |
| TTP, min. | 10.8 | 10.9 | 13.9 | 12.2 | 38.0 | — | 28.6 | 31.7 |
| EXOTHERM, ° C. | 208 | 203 | 212 | 208 | 119 | — | 143 | 144 |

*Sample 3 and 4 contain 5% styrene.

TABLE 3

Room Temperature Gel Times For Phosphine Iron Complex, Amine Promoters, Unsaturated Polyester & Vinyl Ester.

|  | DION® 9102-70 | | POLYLITE® 31220-00 | |
|---|---|---|---|---|
|  | 1 | 2 | 1 | 2 |
| BrTTPPCu, ppm | 50 | 100 | 100 | 100 |
| ATUR, ppm | 300 | 300 | — | — |
| DMAA, ppm | — | — | 0.3 | 0.3 |
| QUAT, % | 0.2 | 0.2 | 0.3 | 0.3 |
| CHP, % | 1.25 | — | 1.25 | — |
| MEKP, % | — | 1.25 | — | 1.25 |
| GEL TIME, min. | 45.1 | 15.7 | 17.0 | 8.8 |
| TTP, min. | 56.3 | 25.9 | 28.8 | 27.0 |
| EXOTHERM, ° C. | 173 | 174 | 195 | 188 |

TABLE 4

Room Temperature Gel Times For Phosphine Iron Complex, A Copper Salt, Amine Promoters & Unsaturated Polyesters.

| | POLYLITE ® 31022-00 | | | | | | | |
|---|---|---|---|---|---|---|---|---|
| | 1 | 2 | 3 | 4 | 5 | 6 | 7 | 8 |
| FeCl₂bis(dppbz), ppm | 100 | 100 | 100 | 100 | 50 | 50 | 50 | 50 |
| 8% Cu NAP-ALL, ppm | 15 | 15 | 15 | 15 | 15 | 15 | 15 | 15 |
| DMPT, % | 0.2 | 0.2 | 0.1 | 0.1 | 0.2 | 0.2 | 0.1 | 0.1 |
| QUAT, % | 0.2 | 0.2 | 0.3 | 0.3 | 0.2 | 0.2 | 0.3 | 0.3 |
| CHP, % | 1.25 | — | 1.25 | — | 1.25 | — | 1.25 | — |
| MEKP, % | — | 1.25 | — | 1.25 | — | 1.25 | — | 1.25 |
| GEL TIME, min. | 7.0 | 3.3 | 9.5 | 4.2 | 7.0 | 3.3 | 9.4 | 4.2 |
| TTP, min. | 13.5 | 9.1 | 16.3 | 9.8 | 13.0 | 8.7 | 16.1 | 9.8 |
| EXOTHERM, ° C. | 220 | 220 | 219 | 221 | 220 | 221 | 220 | 220 |

TABLE 5

Room Temperature Gel Times For Phosphine Copper Complex, Amine Promoters & Unsaturated Polyesters.

| | POLYLITE ® 31022-00 | | | | | | | |
|---|---|---|---|---|---|---|---|---|
| | 1 | 2 | 3 | 4 | 5 | 6 | 7 | 8 |
| BrTTPPCu | 100 | 100 | 50 | 50 | 100 | 100 | 50 | 50 |
| DMPT, % | 0.2 | 0.2 | 0.2 | 0.2 | 0.1 | 0.1 | 0.1 | 0.1 |
| QUAT, % | 0.2 | 0.2 | 0.2 | 0.2 | 0.3 | 0.3 | 0.3 | 0.3 |
| CHP, % | 1.25 | — | 1.25 | — | 1.25 | — | 1.25 | — |
| MEKP, % | — | 1.25 | — | 1.25 | — | 1.25 | — | 1.25 |
| GEL TIME, min. | 4.1 | 2.5 | 4.1 | 2.3 | 6.2 | 4.4 | 7.3 | 3.6 |
| TTP, min. | 12.3 | 9 | 10.2 | 7.7 | 13.5 | 11.2 | 14.2 | 9.7 |
| EXOTHERM, ° C. | 219 | 220 | 220 | 220 | 218 | 218 | 219 | 220 |

Although selected embodiments of the present invention have been disclosed for illustrative purposes, those skilled in the art will appreciate that various modifications, additions and substitutions are possible, without departing from the scope and spirit of the invention as disclosed in the accompanying claims.

That which is claimed is:

1. A composition for the curing of thermosetting resins, wherein said composition comprises:
   a) an organophosphine metal complex;
   b) a tertiary amine;
   c) a peroxide initiator;
   d) optionally a transition metal salt essentially free of cobalt; and
   e) optionally a quaternary ammonium or phosphonium salt.

2. The composition of claim 1, wherein the phosphine compound of the organometal phosphine metal complex containing compound comprises a phosphine compound with the structure of Formula I:

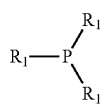

wherein $R_1$ is, independently in each instance, H, hydroxyl, branched or cyclic aliphatic containing $C_1$ to $C_6$, $C_1$-$C_4$ alkoxy; aryl e.g., $C_6$-$C_{20}$ monocyclic or polycyclic aryl such as phenyl, toluoyl, naphthyl, biphenyl, terphenyl, aryl aromatic containing halogens, amino, silyl; hetheroalkyl e.g., $C_6$-$C_{20}$ monocyclic or polycyclic heteroaryl such as thienyl, furyl, imidazolyl, pyrazolyl, pyridyl, pyraznyl, pyrimidyl, pyridazinyl, indolyl, quinolyl, and isoquinolyl.

3. The composition of claim 1, wherein the metal of the metal salt comprises a metal selected from the group consisting of lithium, calcium, copper, vanadium, zirconium, titanium, zinc, iron, sodium, potassium, magnesium, manganese and barium and the salt comprises chlorides, bromides, iodides, nitrates, sulfates, phosphates, oxalates, salicylates, acetonates, alkyl organic acids, carboxylates, and naphthenates, and the like.

4. The composition of claim 1, wherein the phosphine compound of the organophosphine metal complex containing compound comprises a phosphine compound with the structure of Formula III:

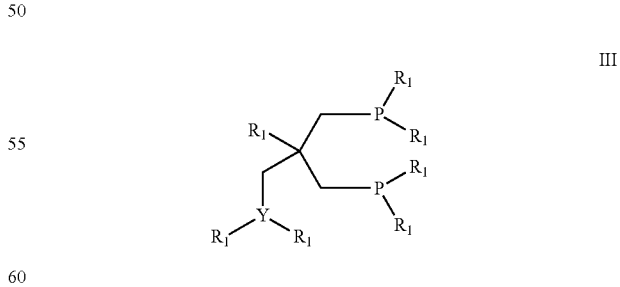

wherein $R_1$ is, independently in each instance, H, hydroxyl, branched or cyclic aliphatic containing $C_1$ to $C_6$, $C_1$-$C_4$ alkoxy; and Y is N or P.

5. The composition of claim 1, wherein the organophosphine metal complex containing compound comprises a phosphine selected from the group consisting of (2,4)-Bis(di-tert-butylphosphino)pentane, 1,4-Bis(di-tert-butylphosphino)butane, 1,2-Bis(di-tert-butylphosphino)ethane, Bis(di-tert-butylphosphino)methane, Bis(di-tert-butylphosphino)pentane, 1,3-Bis(di-tert-butylphosphino)propane, 1,2-Bis(dicyclohexylphosphino)ethane, 1,3-Bis(dicyclohexylphosphino)propane, 1,4-Bis(dimethylphosphino)butane, 1,2-Bis(dimethylphosphino)ethane, 1,3-Bis(dimethylphosphino)propane, Bis(dimethylamino)methylphosphine, di-tert-butylmethylphosphine, di-tert-butylneopentylphosphine, di-tert-butylphenylphosphine, dicyclohexylnorbornylphosphine, dripropylphosphine, triisopropylphosphine, tri-tert-butylphosphine, triisobutylphosphine, tricyclohexylphosphine, tris(2-furyl)phosphine, tris(3-methoxypropyl)phosphine, tris(1-naphthyl)phosphine, trimethylphosphine, triethylphosphine, diethylphenylphosphine, triphenylphosphine, ortho-phenylene bis(diphenylphosphine), ortho-phenylene bis(dimethylphosphine), ortho-phenylene bis(diethylphosphine), ortho-phenylene bis(ethylphenylphosphine), tris(diphenylphosphinoethyl)phosphine, tris(diethylphosphinoethyl)phosphine, tris(dimethylphosphinoethyl)phosphine, tris(ethylphenylphosphinoethyl)phosphine, (2-methoxyphenyl)methylphenylphosphine, 1-Bromo-2-diphenylphosphinobenzene, dimethyl(phenyl)phosphine, cyclohexyldiphenylphosphine, cicyclohexylphenylphosphine, Bis(3,5-ditrifluoromethylphenyl)phenylphosphine, di-tert-butyl(4-dimethylaminophenyl)phosphine, (4-dimethylaminophenyl)diphenylphosphine, Bis(2-(bis(diethylamido)phosphino)phenyl)ether, Bis(2-diphenylphosphinoethyl)phenylphosphine, 2,6-Bis(diphenylphosphinomethyl)pyridine, 2,6-Bis[bis(3,5-dimethylphenyl)phosphinomethyl]pyridine, 2-(diphenylphosphino)pyridine, Bis(2-diphenylphosphinophenyl)ether, diphenylphosphinostyrene, ethyldiphenylphosphine, methyldiphenylphosphine, 2,2'-Bis(diphenylphosphino)-1,1'-binaphthyl, (2,3)-Bis(diphenylphosphino)butane, (2,5)-Bis(diphenylphosphino)hexane, 1,2-Bis(diphenylphosphino)propane, (1,2)-Bis[(2-methoxyphenyl)phenylphosphino]ethane, 2,2'-Bis[bis(3,5-dimethylphenyl)phosphino]-1,1'-binaphthyl, 1,4-Bis[bis(3,5-dimethylphenyl)phosphino]butane, 1,2-Bis[bis(3,5-dimethylphenyl)phosphino]ethane, Bis[bis(3,5-dimethylphenyl)phosphino]methane, 1,5-Bis[bis(3,5-dimethylphenyl)phosphino]pentane, 1,3-Bis[bis(3,5-dimethylphenyl)phosphino]propane, 2,2'-Bis[bis(3,5-ditrifluoromethylphenyl)phosphino]-1,1'-binaphthyl, 2,2'-Bis(di-p-tolylphosphino)-1,1'-binaphthyl, (1,2)-Bis[(2-methoxyphenyl)phenylphosphino]ethane, 1,3-Bis[bis(o-methoxyphenyl)phosphino]propane, 1,4-Bis[bis(3,5-ditrifluoromethylphenyl)phosphino]butane, 1,2-Bis[bis(3,5-ditrifluoromethylphenyl)phosphino]ethane, Bis[bis(3,5-ditrifluoromethylphenyl)phosphino]methane, 1,3-Bis[bis(3,5-ditrifluoromethylphenyl)phosphino]propane, Bis[bis(3,5-ditrifluoromethylphenyl)phosphino]methane, 1,2-Bis(di-tert-butylphosphino)benzene, 2,2'-Bis(di-tert-butylphosphino)biphenyl, 1,2-Bis(di-tert-butylphosphinomethyl)benzene, 1,3-Bis(di-tert-butylphosphinomethyl)benzene, 1,2-Bis(dicyclohexylphosphino)benzene, 2,2'-Bis(dicyclohexylphosphino)-1,1'-binaphthyl, 2,2'-Bis(dicyclohexylphosphino)biphenyl, 1,2-Bis(diphenylphosphino)benzene, 2,2'-Bis(diphenylphosphino)-1,1'-binaphthyl, 2,2'-Bis(diphenylphosphino)-1,1'-biphenyl, 1,4-Bis(diphenylphosphino)butane, 1,2-Bis(diphenylphosphino)ethane, Bis(2-diphenylphosphino)ethyl ether, Bis(2-diphenylphosphinoethyl)phenylphosphine, 1,6-Bis(diphenylphosphino)hexane, Bis(diphenylphosphino)methane, 1,5-Bis(diphenylphosphino)pentane, Bis(2-diphenylphosphinophenyl)ether, 1,3-Bis(diphenylphosphino)propane, 2,2'-Bis[bis(3,5-dimethylphenyl)phosphino]-1,1'-binaphthyl, 2,2'-Bis[bis(3,5-ditrifluoromethylphenyl)phosphino]-1,1'-binaphthyl, 2,2'-Bis[bis(4-methylphenyl)phosphino]-5,5',6,6',7,7',8,8'-octahydro-1,1'-binaphthyl, (1R,2R)-Bis[(2-methoxyphenyl)phenylphosphino]ethane, 1,1'-Bis[bis(diethylamino)phosphino]ferrocene, 1,1'-Bis(di-tert-butylphosphino)ferrocene, 1,1'-Bis(dicyclohexylphosphino)ferrocene, 2-tert-Butylimino-2-diethylamino-1,3-dimethyl-perhydro-1,3,2-diazaphosphorine, tert-Butylimino-tri(pyrrolidino)phosphorane, Hexaethylphosphorous triamide, Hexaisopropylphosphorus triamide, Tris(4-morpholino)phosphine, and any combination thereof.

6. The composition of claim 1, wherein the peroxide initiator is selected from the group consisting of cumene hydroperoxide, methyl ethyl ketone peroxide, benzoyl peroxide, 2,4-pentanedione peroxide, 2,5-dimethylhexane-2,5-dihydroperoxide, tert-butyl peroxybenzoate, di-tert-butyl perphthalate, dicumyl peroxide, 2,5-dimethyl-2,5-bix(tert-butylperoxide)hexane, 2,5-dimethyl-2,5-bis(tert-butylperoxy)hexyne, bis(tert-butylperoxyisopropyl)benzene, ditert-butyl peroxide, 1,1-di(tert-amylperoxy)-cyclohexane, 1,1-di-(tert-butylperoxy)-3,3,5-trimethylcyclohexane, 1,1-di-(tert-butylperoxy)-cyclohexane, 2,2-di-(tert-butylperoxy)butane; n-butyl-4,4-di(tert-butylperoxy)valerate, ethyl-3,3-di-(tert-amylperoxy)butyrate, ethyl-3,3-di(tert-butylperoxy)-butyrate, t-butyl peroxy-neodecanoate, di-(4-5-butyl-cyclohexyl)-peroxydicarbonate, lauryl peroxide, 2,5-dimethyl-2,5-bis(2-ethyl-hexanoyl peroxy)hexane, t-amyl peroxy-2-ethylhexanoate, 2,2'-azobis(2-methylpropionitrile), 2,2'-azobis(2,4-methylbutanenitrile), and mixtures of any thereof.

7. The composition of claim 1, wherein the tertiary amine is a thiourea.

8. The thermosetting resin of claim 1, wherein the tertiary amine is selected from the group consisting of N,N-dimethyl aniline, N,N-diethyl aniline, N,N-dimethyl acetoacetamide, N,N-dimethyl p-toluidine, trithylamine, triethanolamine, and tertiary aromatic amines.

9. The composition of claim 1, wherein the metal of the organophosphine metal complex comprises a metal selected from the group consisting of lithium, calcium, copper, vanadium, zirconium, titanium, zinc, iron, sodium, potassium, magnesium, manganese and barium.

10. The composition of claim 9, wherein the metal complex is ferrous chloride or copper bromide.

11. The composition of claim 1, wherein the organophosphine metal complex containing compound comprises a phosphine compound with the structure of Formula II:

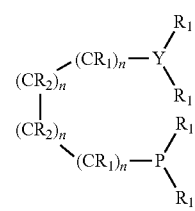

wherein $R_1$ is, independently in each instance, H, hydroxyl, branched or cyclic aliphatic containing $C_1$ to $C_6$, $C_1$-$C_4$ alkoxy; $R_2$ is, independently in each instance, H, linear, branched or cyclic aliphatic containing $C_1$ to $C_{14}$, alkyl aromatic, aryl aromatic containing halogen, amino or alkoxy groups and be interconnected by an aliphatic or an aromatic ring; n is 1 to 4; and Y is N or P.

12. The composition of claim 11, wherein the metal of the organophosphine metal complex comprises a metal selected from the group consisting of lithium, calcium, copper, vanadium, zirconium, titanium, zinc, iron, sodium, potassium, magnesium, manganese and barium.

13. The composition of claim 1, wherein the phosphine compound of the organophosphine metal complex containing compound comprises a phosphine compound with the structure of Formula IV:

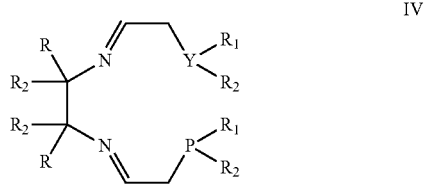

wherein R is, independently in each instance, H, linear, branched or cyclic aliphatic containing $C_1$ to $C_{14}$, alkyl aromatic, aryl aromatic containing halogen, amino or alkoxy groups; $R_1$ is, independently in each instance, H, hydroxyl, branched or cyclic aliphatic containing $C_1$ to $C_6$, $C_1$-$C_4$ alkoxy; $R_2$ is, independently in each instance, H, linear, branched or cyclic aliphatic containing $C_1$ to $C_{14}$, alkyl aromatic, aryl aromatic containing halogen, amino or alkoxy groups and be interconnected by an aliphatic or an aromatic ring; $R_2$ is H, linear, branch or cyclic aliphatic containing $C_1$ to $C_{14}$, alkyl aromatic, aryl aromatic containing halogen, amino or alkoxy groups and be interconnected by an aliphatic or an aromatic ring; and Y is N or P.

14. The composition of claim 13, wherein the metal of the organophosphine metal complex comprises a metal selected from the group consisting of lithium, calcium, copper, vanadium, zirconium, titanium, zinc, iron, sodium, potassium, magnesium, manganese and barium.

15. A thermosetting resin comprising a polyester, vinyl ester, urethane acrylate, or a vinyl hybrid resin and the accelerator of claim 1.

16. The thermosetting resin of claim 15, further comprising a component selected from the group consisting of free radical scavengers, antioxidants, and any combination thereof.

17. The thermosetting resin of claim 15, further comprising an additional curing accelerator or promoter.

18. The thermosetting resin of claim 17, wherein the additional curing accelerator or promoter is a quaternary ammonium or phosphonium salt selected from the group consisting of tetramethylammonium chloride, tetramethylammonium hydroxide, tetramethylammonium bromide, tetramethylammonium hydrogensulfate, benzyltrimethylammonium chloride, benzyltrimethylammonium bromide, benzyltrimethylammonium hydrogen sulfate, benzyltributylammonium chloride, benzyltributylammonium bromide, tetrabutylphosphonium acetate, tetrabutylphosphonium bromide, tetrabutylphosphonium chloride, tetrabutylphosphonium fluoride, tetrabutylphosphonium iodide, tetraphenylphosphonium chloride, tetraphenylphosphonium bromide, tetraphenylphosphonium acetate.

19. The thermosetting resin of claim 15, further comprising a polymerization inhibitor.

20. The thermosetting resin of claim 19, wherein the polymerization inhibitor is selected from the group consisting of phenothiazine, phenol, 2,6-di-tert-butyl-4-methyl phenol, hydroquinone (HQ), toluhydroquinone (THQ), bisphenol "A" (BPA), triphenyl antimony, naphthoquinone (NQ), p-benzoquinone (p-BQ), butylated hydroxy toluene (BHT), hydroquinone monomethyl ether (HQMME), 4-ethoxyphenol, 4-propoxyphenol, and propyl isomers thereof, monotertiary butyl hydroquinone (MTBHQ), ditertiary Butyl hydroquinone (DTBHQ), tertiary butyl catechol (TBC), 1,2-dihydroxybenzene, 2,5-dichlorohydroquinone, 2-acetylhydroquinone, 1,4-dimercaptobenzene, 2,3,5-trimethylhydroquinone, 2-aminophenol, 2-N,N,-dimethylaminophenol, catechol, 2,3-dihydroxyacetrophenone, pyrogallol, 2-methylthiophenol, and mixtures of any thereof.

21. The thermosetting resin of claim 19, wherein the polymerization inhibitor is selected from the group consisting of N,N-di-tert-butylnitroxide; N,N-di-tert-amylnitroxide; N-tert-butyl-2-methyl-1-phenyl-propylnitroxide; N-tert-butyl-1-diethyl phosphono-2,2-dimethyl propyl nitroxide; 2,2,6,6-tetramethyl-piperidinyloxy; 4-amino-2,2,6,6-tetramethyl-piperidinyloxy; 4-hydroxy-2,2,6,6-tetramethyl-piperidinyloxy; 4-oxo-2,2,6,6-tetramethyl-piperidinyloxy; 4-dimethylamino-2,2,6,6-tetramethyl-piperidinyloxy; 4-ethanoyloxy-2,2,6,6-tetramethyl-piperidinyloxy; 2,2,5,5-tetramethylpyrrolidinyloxy; 3-amino-2,2,5,5-tetramethylpyrrolidinyloxy; 2,2,4,4-tetramethyl-1-oxa-3-azacyclopentyl-3-oxy; 2,2,4,4-tetramethyl-1-oxa-3-pyrrolinyl-1-oxy-3-carboxylic acid; 2,2,3,3,5,5,6,6-octamethyl-1,4-diazacyclohexyl-1,4-dioxy; 4-bromo-2,2,6,6-tetramethyl-piperidinyloxy; 4-chloro-2,2,6,6-tetramethyl-piperidinyloxy; 4-iodo-2,2,6,6-tetramethyl-piperidinyloxy; 4-fluoro-2,2,6,6-tetramethyl-piperidinyloxy; 4-cyano-2,2,6,6-tetramethyl-piperidinyloxy; 4-carboxy-2,2,6,6-tetramethyl-piperidinyloxy; 4-carbomethoxy-2,2,6,6-tetramethyl-1-piperidinyloxy; 4-carbethoxy-2,2,6,6-tetramethyl-piperidinyloxy; 4-cyano-4-hydroxy-2,2,6,6-tetramethyl-piperidinyloxy; 4-methyl-2,2,6,6-tetramethyl-1-piperidinyloxy; 4-carbethoxy-4-hydroxy-2,2,6,6-tetramethyl-piperidinyloxy; 4-hydroxy-4-(1-hydroxypropyl)-2,2,6,6-tetramethy 1-piperidinyloxy; 4-methyl-2,2,6,6-tetranlcthyl-1,2,5,6-tetrahydropyridinyloxyl, and mixtures of any thereof.

* * * * *